June 14, 1955      F. NETTEL      2,710,521
CONTROL FOR SUPERCHARGED INTERNAL COMBUSTION ENGINES
Filed Nov. 1, 1949      2 Sheets-Sheet 1
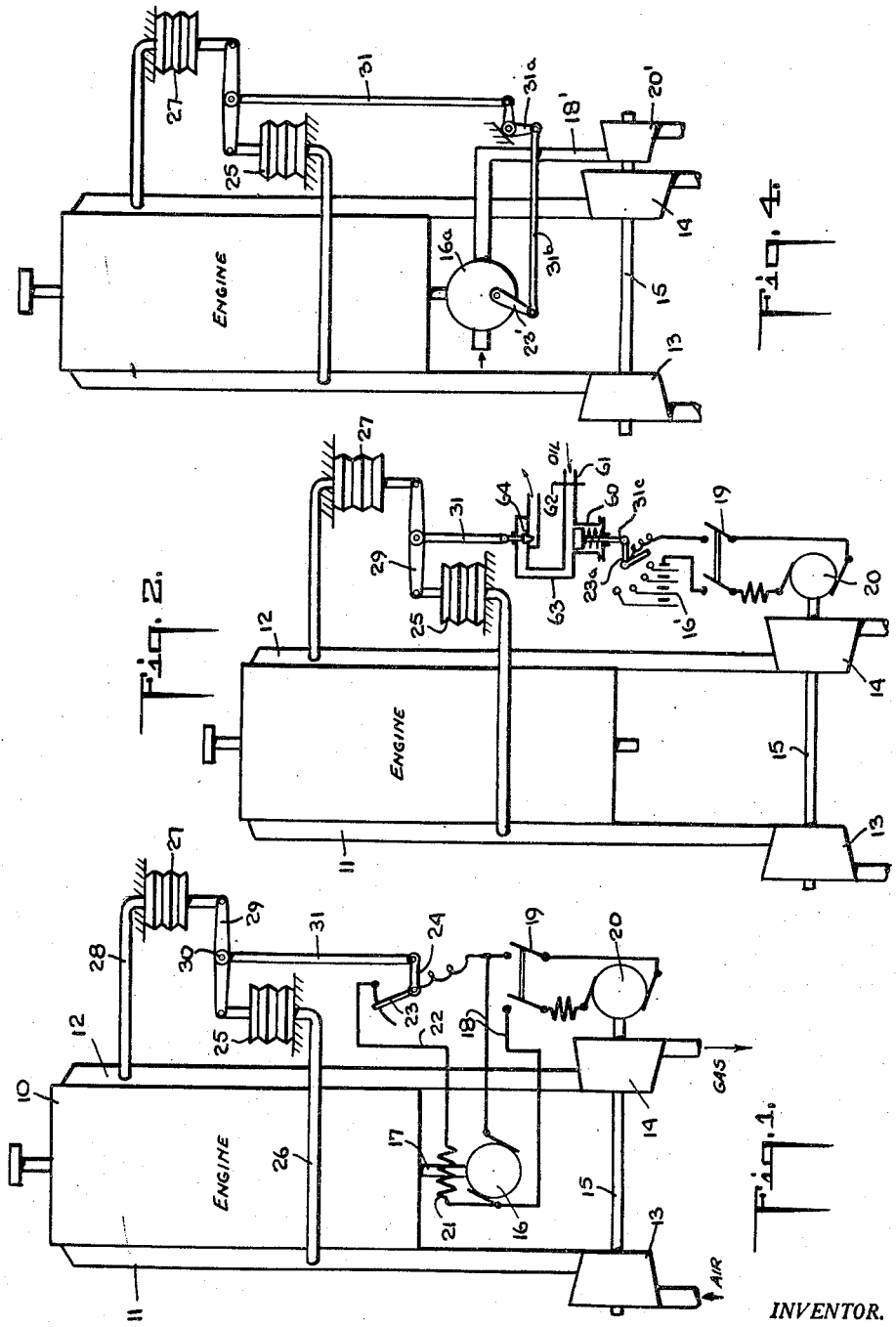
INVENTOR.
FREDERICK NETTEL
BY
ATTORNEY June 14, 1955      F. NETTEL      2,710,521
CONTROL FOR SUPERCHARGED INTERNAL COMBUSTION ENGINES
Filed Nov. 1, 1949      2 Sheets-Sheet 2
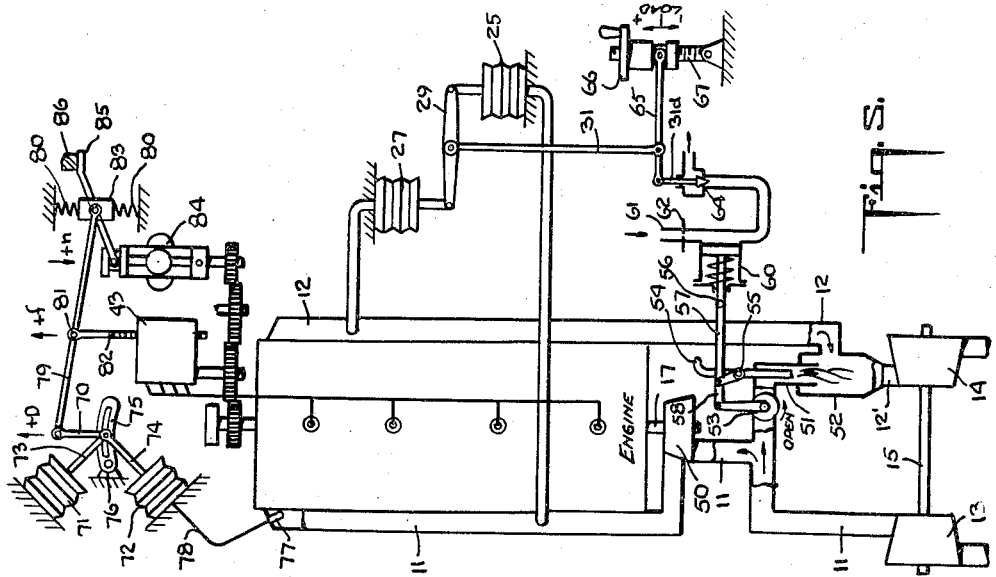
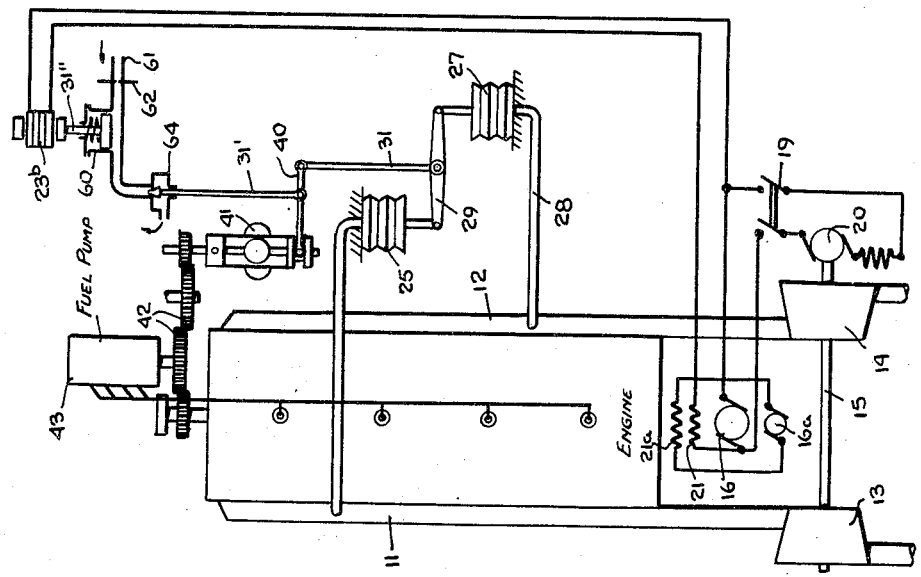
INVENTOR.
FREDERICK NETTEL
BY
ATTORNEY United States Patent Office 2,710,521
Patented June 14, 1955

2,710,521

CONTROL FOR SUPERCHARGED INTERNAL COMBUSTION ENGINES

Frederick Nettel, Manhasset, N. Y.

Application November 1, 1949, Serial No. 124,821

2 Claims. (Cl. 60—13)

This invention deals with internal combustion engines in which charging of the cylinders with air is automatically controlled responsive to changes in operating conditions of the engines. Said invention is a continuation-in-part of my co-pending application Serial No. 18,995 for Supercharged Internal Combustion Engine With Starting Means and Method for Starting Same filed April 5, 1948, now Patent No. 2,503,289 and Reissue No. 23,444.

In order to attain the greatest possible output per unit cylinder volume, it is desirable to supply the largest possible air charge to the cylinders with the smallest possible expenditure of power for this purpose. This is true both for naturally aspirating engines and for supercharged engines, regardless of the type of working cycle, i. e., two-stroke or four-stroke.

The present invention relates in particular to scavenged and supercharged engines in which an exhaust gas driven flow type blower, mechanically independent of the engine shaft, is employed.

In known four-stroke cycle engines in which the power for driving the blower is furnished by an exhaust gas driven turbine, good air charging is attained only above a certain load and/or speed of the engine, when the blower begins to furnish a higher pressure in the engine intake manifold than prevails in the exhaust manifold, i. e., when a positive pressure differential between said manifolds exists.

In engines of the two-stroke cycle type the blower must furnish the positive pressure differential under all working conditions, including starting. In such engines, with a charging blower driven from the engine shaft, the speed ratio between the engine shaft and blower shaft usually is constant, and must be chosen not only to give good results over the whole load and speed range of the engine, but also for good starting. Compromise ratios are the result which may cause waste of power consumption by the blower at low loads and/or speeds of the engine. Experiments show that at lower loads and speeds lower positive pressure differentials are sufficient than at high loads and/or speeds. It is thus desirable to provide means to furnish optimum positive pressure differentials for all operating conditions of the engines.

The instant invention achieves this by providing additional driving means for the flow type air blowers driven mechanically independently of the engine shaft, said driving means being automatically controlled responsive to the pressure differential between the engine intake and exhaust manifolds so as to maintain it at predetermined positive values under varying operating conditions of the engines.

According to a modification of this invention said driving means is simultaneously controlled by said pressure differential and by the speed of the engine, resulting in said pressure differential increasing with the engine speed in a predetermined manner.

It is immaterial for the purposes of this invention what type of additional driving means for the blower, arranged mechanically independently of the engine shaft, is employed. For example this drive may be thermal, electrical, or pneumatic from a separate heat or power source, or the necessary energy may be furnished by the engine charged by the driven blower.

The accompanying drawings show diagrammatically, by way of non-limiting examples, plants embodying the invention:

Fig. 1 indicates an engine with automatic regulation of an electric supplemental drive for the supercharging blower.

Fig. 2 shows basically the same type of regulation as in Fig. 1 but with the electrical supplemental drive fed from a different source.

Fig. 3 depicts a modification of the plant shown in Fig. 1, the supplemental drive being automatically regulated in response to a pressure differential and to engine speed.

Fig. 4 indicates another modification of the plant shown in Fig. 1, wherein the supplemental drive is pneumatic.

Fig. 5 is another modification for two-stroke cycle engines with a shaft-driven displacement blower in series with a flow type blower, the additional drive being thermal; besides, the fuel feed to the engine cylinders is automatically regulated in proportion to the density of the air charged to the engine.

Referring now in detail to the drawing, and more particularly to Fig. 1, the reference numeral 10 denotes an engine of the four- or two-stroke cycle type, having an air intake pipe 11, a gas exhaust pipe 12, a flow-type charging blower 13, and an exhaust gas turbine 14 coupled to the blower by a shaft 15. An electric dynamo 16 driven from the engine shaft 17 is connected by cables 18 and a switch 19 to an electric motor 20 also coupled to the shaft 15. A shunt winding 21 of the dynamo 16 is connected by lead 22 to a shunt regulator 23 having a control lever 24.

An elastic bellows 25 is maintained in communication with the air intake pipe 11 by a conduit 26 while another bellows 27 is similarly connected to the exhaust pipe 12 by a conduit 28. Both these bellows are disposed, as shown, to act on the ends of a floating lever 29 from opposite directions thus making the motion of point 30 responsive to the difference of the motions of the bellows and thus to the difference of pressures in pipes 11 and 12. Said lever is connected at point 30 intermediate its ends to the control lever 24 by a link 31.

The arrangement operates as follows: With the engine operating at a certain load and speed the supercharger set, consisting of the blower 13 and turbine 14, will supply a certain air pressure in pipe 11 and a somewhat lower pressure normally will exist in pipe 12, in fact must exist if the engine 10 is of the two-stroke cycle type. The bellows 25 and 27, under the influence of the pressures in the pipes 11 and 12, will move shunt regulator 23 to such a position as to cause no power to be transmitted to the motor 20 as long as the pressure difference between pipes 11 and 12 remains at a desired value which is such that the supercharger set can function without external assistance. If now the engine is required to furnish a greater output, more fuel is fed to the cylinders and the pressure in pipe 12 will tend to rise. Since the speed of the supercharger set will not follow immediately, the said pressure difference will fall, bellows 27 will expand, thereby pushing the right hand end of lever 29 downward with the left hand end as fulcrum. In turn link 31 moves downward, actuating the shunt regulator 23 by its lever 24 to strengthen the field 21 of dynamo 16 so as to cause it to drive the motor 20. The additional power on the connecting shaft 15 causes the turbocharger to speed up until, by raising the pressure produced in the blower 13, the pressure difference between pipes 11 and 12 is restored. This restoration will again cause the shunt regulator to affect the dynamo in such manner as to reduce the power transmitted to the motor 20. Such reduction may be to zero if the turbocharger set can supply the pressure difference by itself, or there may be a constant flow of energy to the said motor, if it cannot. In any case proper charging will be maintained.

In case of load reduction the speed of the turbocharger set will be allowed to drop in consonance with the drop in pressure in pipe 12, but not lower than required to maintain the prescribed pressure difference. By opening switch 19 the automatic regulation can be put out of action.

Actually, point 30 will be moved only slightly by disturbances in the said pressure difference, so that lever 24 would have to be very short to move the contact arm over the whole working angle of the shunt regulator 23; preferably a servo mechanism of any known kind will be interposed as is shown and described in the Fig. 2, Fig. 3 and Fig. 5 embodiments of my invention. Fig. 2 shows an arrangement similar to that of Fig. 1 except that instead of the electric power being supplied by the dynamo 16, it is taken from a battery 16'. A voltage regulator 23a replaces the shunt regulator 23. In this example the motion of link 31 is not directly transmitted to the regulator 23a. Rather the link 31 controls an oil pressure operated, spring-loaded servo cylinder 60 the amplified movement of whose output element actuates a link 31c connected to the regulator. This cylinder is supplied with oil under pressure through a pipe 61 (source not shown) provided with a fixed orifice 62. The oil leaves the cylinder through pipe 63 and needle valve 64, which latter is operated by link 31. If, for example, the pressure difference drops, as described for Fig. 1, link 31 moves downwards, closing the valve 64 a little and thereby raising the oil pressure in cylinder 60. The piston in that cylinder and the link 31c connected to it move downwards thus putting the regulator 23a in operation. The voltage supplied to motor 20 is increased by switching in of additional battery cells, thereby increasing the power transmitted to said motor. Reverse motion of link 31 causes the piston in cylinder 60 to move upwards by the spring acting on it.

Fig. 3 indicates another modified arrangement. Here the link 31 acts on the right hand end of a second floating lever 40, the left hand end of which is actuated by a flyball governor 41 driven from the engine through a gear train 42. The fuel pump 43 for injecting fuel to the cylinders is driven from the same gear train. The link 31', pivoted between the ends of lever 40, is disposed to actuate needle valve 64 of a servomechanism as described for Fig. 2. The piston in cylinder 60 acts here through link 31'' on a shunt regulator 23b of the carbon pile type.

As long as the speed of the engine remains unchanged, the operation is basically the same as described for Fig. 1 or 2. But if, for example, the speed rises, the left hand end of lever 40 which thus far was stationary, begins to rise, adding to the action of the bellows, and thus causes the turbocharger set to operate at a speed which will give a pressure difference between pipes 11 and 12 rising with engine speed, which, as mentioned before, is desirable for certain types of engine operation.

Where the engine has to operate over a large speed range, the voltage of dynamo 16 may tend to vary considerably, which may interfere with proper regulation. Various known means may be employed to decrease these voltage variations. In Fig. 3 an auxiliary exciter 16a is shown, for example, which with increasing speed furnishes increasing voltage to a counter-excitation winding 21a of the dynamo 16 whose voltage can thus be stabilized to the desired degree.

Fig. 4 represents still another modification of the invention in which the dynamo 16 is replaced by a variable delivery air compressor 16a driven from the engine shaft and feeding through conduit 18' an air turbine 20' coupled to the shaft 15. The link 31 acts in this case through bell crank 31a and rod 31b on the regulating lever 23' of the pump 16a.

With decreasing pressure difference, the pump 16a supplies more air to the air turbine 20' thus enabling it to assist the gas turbine 14 much in the same manner as the motor 20 does in Fig. 1.

The alternative arrangement shown in Fig. 5 is particularly suited for two-stroke cycle engines and employs a second displacement or flow-type blower 50 driven from the engine shaft, and arranged in series with the flow-type blower 13 driven by the exhaust gas turbine 14. The arrangement of the bellows, including the servomechanism, is basically the same as described for Fig. 2. The supplemental power for the turbocharger set is here, however, furnished by air bypassed from the pipe 11 through a conduit 51 into a combustion chamber 52 through a valve 53. In this bypassed air fuel is sprayed from a source under pressure (not shown) through a pipe 54 and fuel valve 55, and burned therein. The hot gases thus formed mix with the gases from the engine which enter the discharge from the combustion chamber before they reach the turbine 14 through pipe 12'. Valves 53 and 55 are operated from the bellows 25, 27 through a servomechanism as described before, and by piston rod 56, link 58 and link 57 in such manner that hot gases to assist the turbine 14 in driving the blower are produced when the pressure difference between pipes 11 and 12 falls below the predetermined value.

In this example link 31 acts on another two-armed lever 65, as shown, the left hand end of which actuates rod 31d of needle valve 64, while the right hand end is movably fixed to nut 66 with fixed handwheel. This nut can be screwed up or down on the load adjusting screw 67. As long as nut 66 is not moved, the right hand end of lever 65 turns on a fixed point, and link 31 operates rod 31d and valve 64 in the same manner as shown for Fig. 3.

Assuming that the engine operates at a certain load, all bellows, links and rods will be at rest. If now a higher supercharge is required, nut 66 is turned to move upwards, thereby closing valve 64 somewhat. The resulting higher oil pressure under the piston of servocylinder 60 moves it to the left, thereby increasing the air and fuel flow to the combustion chamber 52. The resulting increased gas flow through turbine 14 causes the turbocharger set to speed up and produce the desired higher charging air pressure. Generally such higher pressure is desired for higher load or torque requirements of the engine.

Fig. 5 shows also an automatic fuel feed regulation, increasing the fuel charge per working stroke in the cylinders substantially in proportion to the density of the air charge. This detail forms part of my co-pending application Ser. No. 770,395, filed August 25, 1947, now Patent No. 2,608,051. At a given ambient air pressure at the inlet to the charging blower, the air density D in the intake manifold 11 is defined by a certain non-linear ratio of the air temperatures $T_1$ and $T_2$ at these two points. A movement substantially proportional to D is obtained on rod 70 by having thermostatic bellows 71 and 72 operated by $T_1$ and $T_2$, respectively. Bellows 71 is in direct contact with the ambient air, while bellows 72 is influenced by the thermostat bulb 77 disposed in the air intake manifold 11 and connected to bellows 72 by a tube 78. These bellows are arranged at an angle and jointly act through rods 73 and 74 on a pivot block slidable in a suitably shaped slot in a lever 75 turning around a fixed point 76 at its left hand end. Rod 70 is connected to one end of a floating lever 79 while its other end 83 is resiliently pivoted between two springs 80. An intermediate point 81 on the rod 70 is connected to the rack rod 82 of the conventional fuel injecting pump 43. Point 83 is connected by a lever 85 to a fly ball governor 84 driven from the engine. Upward movement of the right hand end of lever 85 is limited by a stop 86.

Assuming the engine to be operating at a certain load and a certain charging pressure, the lever 79 will be in a certain position so that the fuel pump 43 furnishes the correct amount of fuel per working stroke to suit the density D of the air charge in the cylinders. If, for example, the air density is increased by operating the nut 66, the rod 70 pushes the left hand end of lever 79 upwards, with point 83 as a fulcrum and consequently moves rack 82 upwards, thereby increasing the fuel quantity furnished by pump 43 in proportion to the increase in air density. This enables the engine to carry a higher load without substantial change in the air:fuel ratio. The reverse action takes place when the density drops.

The speed of the engine can adjust itself to the torque requirement, which is of interest for traction applications (trucks, locomotives), and the speed governor 84 comes into action only if the engine speed exceeds a permissible value. In such case the governor 84 pulls point 83 against the action of the springs 80 downwards around stop 86 as a fulcrum, and so reduces the fuel feed to the engine by pulling the rack 83 downwards.

It is within the scope of this invention to employ still other means to supply supplemental power for driving the blower, it being only necessary that this additional power be governed by the pressure differential between the engine intake and exhaust pipe.

Disturbances in the pressure differential between the engine intake and gas exhaust pipes requiring regulation according to this invention may be caused by external influences, for example by lowering of the air pressure at the blower intake due to throttling of the air, or by increase of back pressure at the turbine outlet due to flow resistance in the discharge pipe to the ambient atmosphere. Such conditions are encountered in certain marine applications where the gases may be required to be discharged at times under water. Such disturbances will cause the proper corrective adding of supplemental power to the exhaust turbine shaft.

Having now particularly described and ascertained the nature of my said invention and in what manner the same is to be performed, I declare that what I claim is:

1. In combination with an internal combustion engine of the reciprocating type including charging blower means driven by exhaust gas actuated turbine means, both said means being mechanically independent of the engine shaft, supplemental driving means for said blower means, means to automatically control said supplemental driving means responsive to the difference of pressures prevailing at the air intake to and the gas exhaust from the engine cylinders, respectively, so as to maintain said difference at predetermined values under varying working conditions of the engine, and means to control said supplemental driving means responsive to the engine speed simultaneously with the pressure difference control.

2. In combination with an internal combustion engine of the reciprocating type including charging blower means driven by exhaust gas actuated turbine means, both said means being mechanically independent of the engine shaft, supplemental driving means for said blower means, means to automatically control said supplemental driving means responsive to the difference of pressures prevailing at the air intake to and the gas exhaust from the engine cylinders, respectively, so as to maintain said difference at predetermined values under varying working conditions of the engine, and means to control said supplemental driving means responsive to the engine speed simultaneously with the pressure difference control in such manner that said pressure difference rises with the engine speed.

References Cited in the file of this patent

UNITED STATES PATENTS

| | | |
|---|---|---|
| 1,428,924 | Thomas | Sept. 12, 1922 |
| 2,036,989 | Buchi | Apr. 7, 1936 |
| 2,438,663 | Greenland | Mar. 20, 1948 |
| 2,622,391 | Lindeman | Dec. 23, 1952 |

FOREIGN PATENTS

| | | |
|---|---|---|
| 308,585 | Great Britain | Oct. 16, 1930 |
| 399,520 | Great Britain | Oct. 6, 1933 |
| 513,971 | Great Britain | Oct. 26, 1939 |
| 620,376 | Great Britain | Mar. 23, 1949 |